June 17, 1941.  C. H. ALEXANDER ET AL  2,245,742

VINYL RESIN AND METHOD OF PREPARING THE SAME

Filed Dec. 22, 1938

Inventors
Claude H. Alexander
Harold Tucker
By Willis T. Avery
Atty

Patented June 17, 1941

2,245,742

UNITED STATES PATENT OFFICE 2,245,742

VINYL RESIN AND METHOD OF PREPARING THE SAME

Claude H. Alexander and Harold Tucker, Cuyahoga Falls, Ohio, assignors to The B. F. Goodrich Company, New York, N. Y., a corporation of New York Application December 22, 1938, Serial No. 247,204

7 Claims. (Cl. 260—80)

This invention relates to a new type of vinyl resin and to a method of preparing the same.

Vinyl chloride is known to form polymers of varying properties. Thus the alpha polymer is soluble in acetone, chloroform, nitrobenzene, chlorbenzene, acetophenone, ethyl benzoate, aniline, and other common solvents. The beta polymer is soluble in all of the above-mentioned solvents except acetone and chloroform. The gamma polymer is virtually insoluble in every solvent at room temperature. The gamma polymer has the valuable property of forming resilient, rubber-like compositions upon being plasticized as disclosed in U. S. Patent 1,929,453 issued to Waldo L. Semon. The gamma polymer would accordingly be the best polymer for use in paints, lacquers, and other film-forming compositions were it not for its extreme insolubility.

The gamma polymer is also superior to the soluble polymers in strength and impact resistance. The gamma polymer has a much higher melting point than the soluble polymers, however, and cannot be satisfactorily milled or extruded in the absence of plasticizers even at 120–130° C. Unfortunately, the gamma polymer is rather unstable at high temperatures, and decomposes readily at the temperatures at which it can be worked. It has not heretofore been possible to take full advantage of the great strength and impact resistance of the unplasticized gamma polymers because of the impossibility of fashioning extruded or molded articles therefrom.

It is an object of this invention to produce vinyl polymers which are more soluble than gamma polyvinyl chloride, but which have, when plasticized, greater tensile strengths and elongations than the soluble vinyl polymers.

It is another object of this invention to produce vinyl polymers which are more soluble than gamma polyvinyl chloride, but which have greater impact strength than the soluble polymers.

Another object of this invention is to produce vinyl polymers which have the strength and impact resistance of gamma polyvinyl chloride, but which can be milled, extruded, molded, etc., at temperatures below those at which breakdown of the polymer occurs.

These and other objects will be apparent from the following description of the invention.

We have discovered that polymers having the desirable properties of gamma polyvinyl chloride in addition to certain of the desirable properties of the soluble polyvinyl chlorides may be prepared by copolymerizing in an aqueous emulsion vinyl chloride and vinylidene chloride ($CH_2=CCl_2$, the latter being present in amounts up to 75%. The copolymers containing up to 15% of vinylidene chloride resemble hard rubber and have properties which make them particularly suited to use as molding materials, while the polymers containing from 15% to 75% of vinylidene chloride are more like plasticized polyvinyl chloride and are suited to use as paint and lacquer constituents as will be hereafter explained.

The conditions under which the copolymers are formed has a great effect on their properties. Thus, it has been previously observed that in a polymerization process carried out in solution, the incorporation of catalytic amounts of vinylidene chloride decreases the time necessary for the polymerization of vinyl chloride and increases the insolubility of the product. The effect is much different in a polymerization process carried out in aqueous emulsion, since the polymerization proceeds more slowly in the presence of vinylidene chloride and more soluble polymers are formed. The temperature of polymerization also affects the properties of the products, the copolymers produced at higher temperatures having increased solubility. In producing the copolymers of this invention, the polymerization is preferably effected at a temperature between 40° C. and 50° C. inclusive, although copolymers of inferior properties may be produced at higher temperatures and good copolymers may be produced at lower temperatures. The rate of polymerization at lower temperatures, however, is inconveniently slow.

The polymerization is generally effected in a pressure vessel lined with glass or lead or other metal which does not affect the polymerization, and provided with shaking, rotating, or other means to agitate the batch during polymerization. Besides the vinyl chloride, vinylidene chloride, and water, the charge ordinarily consists of a catalyst and an emulsifying agent. The polymerization is catalysed by an oxidation catalyst, preferably a peroxygen compound, which class includes peroxides such as hydrogen peroxide, benzoyl peroxide, barium peroxide and calcium peroxide, per-acids such as persulfuric acid and per-salts such as perborates, percarbonates, perphosphates, etc. The emulsifying agent is preferably a saponaceous wetting agent such as soap or even better one of the newer synthetic soap-like materials such as sodium lauryl sulfate, sodium naphthalene sulfonate, or similar materials sold under trade names such as "Tergitols," and "Nekals," although other emulsifying agents may be used.

In order to illustrate the properties of the copolymers of this invention, polyvinyl chloride and mixtures of polyvinyl chloride and vinylidene chloride were polymerized using a standard procedure but varying the time and temperature. A glass-lined bomb having a capacity of 2 gallons was chilled to −20° C. The charge consisted of monomer 2500 g., benzoyl peroxide 25 gms. and a 1% aqueous solution of the emulsifying agent "Nekal AEM" 3750 gms. The bomb was sealed and rotated in a constant temperature bath for the desired length of time, 65 hours at a temperature of 40° C. or 50° C. being illustrative of the conditions ordinarily employed. The polymer or copolymer was removed from the bomb, washed repeatedly with boiling water, and dried for 18 hours at 60–70° C.

One of the outstanding properties of the copolymers of this invention is the ease with which they may be processed. Gamma polyvinyl chloride can be milled, extruded, and molded only at temperatures as high as 300° F. and even at these temperatures the products have internal stresses and strains. The copolymers of this invention may be processed at lower temperatures to give products which are remarkably free from internal stresses and strains. Thus, a copolymer containing 10% of vinylidene chloride polymerized for 65 hours at 40° C. may be readily homogenized on a mill at 220° F. and may be extruded at 220° F. to give strong pipe having excellent shatter-resistance.

The properties of the copolymers of this invention will be better understood from the accompanying drawing of which Fig. 1 represents the variation of impact strength with the amount of vinylidene chloride in the copolymer;

Figure 1:
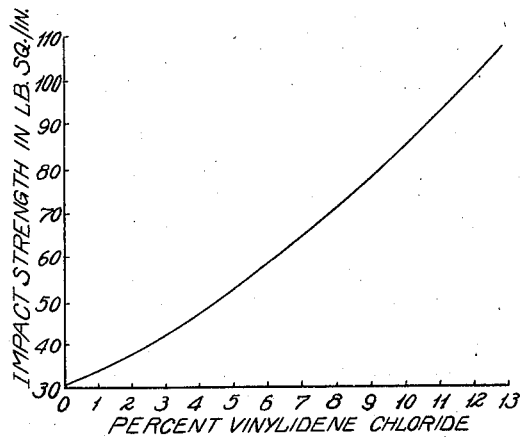

The variation in impact strength with increasing amounts of vinylidene chloride is shown in Fig. 1 of the accompanying drawing. The impact resistance was measured by the standard hard rubber impact test, A. S. T. M. designation D256–34T, on tensile sheets which had been molded in a press for 5 minutes at 307° F. It is apparent that the copolymers not only have better processing characteristics, but that the properties of the processed products are superior to those made from the gamma polymer.

Figure 2:
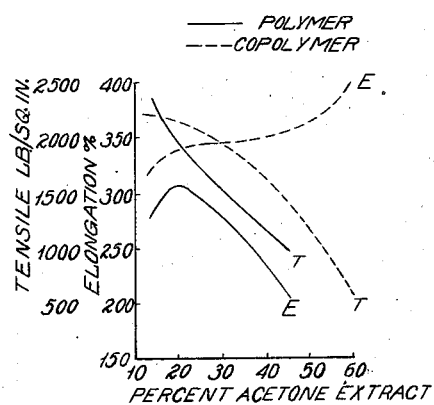
Fig. 2 represents the variation of tensile strength and elongation of polyvinyl chloride and copolymers of vinyl chloride and vinylidene chloride with acetone extract.

The suitability of polyvinyl chlorides for making plasticized products is ordinarily judged by the acetone extract. High acetone extracts indicate that weak compositions or soft, tacky masses will be obtained upon plasticization. Low acetone extracts, on the other hand, indicate that the product is composed largely of the gamma polymer. Copolymers of vinyl chloride and vinylidene chloride exhibit greater tensile strengths and elongations than vinyl chloride polymers of the same acetone extract. Conversely, the soluble copolymers have the desirable characteristics heretofore found only in relatively insoluble polymers. This is shown in Fig. 2 of the accompanying drawing in which the tensile and elongation of tensile sheets heated in a press for 20 minutes at 297° F. of both polymers and copolymers plasticized with 43% of tricresyl phosphate, are plotted against the acetone extract of the unplasticized materials. The acetone extract on a copolymer formed in 65 hours at 40° C. increases rapidly with increased amounts of vinylidene chloride, a copolymer containing 2.5% of vinylidene chloride having an acetone extract of about 20% and copolymers containing about 10% of vinylidene chloride having an acetone extract of about 50%. It is clear from the graph that compositions polymerized for 65 hours at 40° C. containing from 2.5% to 10% of vinylidene chloride have greater tensile strengths than vinyl chloride polymers having equivalent acetone extracts. The elongation of the copolymers is greater throughout the whole range.

Figure 3:
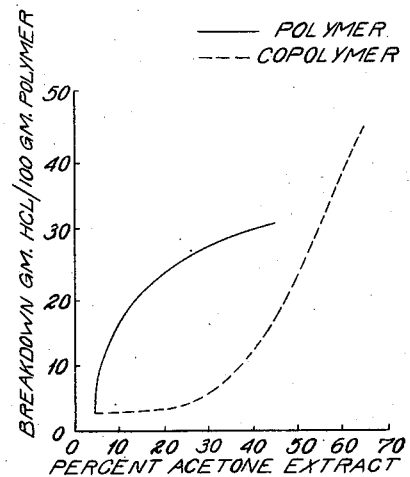
Fig. 3 represents the variation of the stability of polyvinyl chloride and copolymers of vinyl chloride and vinylidene chloride with acetone extract.

Another unexpected property of the copolymers containing up to about 15% of vinylidene chloride is their stability. Polyvinyl chlorides have a decided tendency to split off HCl when heated. Polymerized vinylidene chloride is even more unstable. The copolymers containing relatively small amounts of vinylidene chloride, however, exhibit a markedly greater stability than either component. This is illustrated in Fig. 3 of the drawing wherein the breakdown of the polymer and copolymer when heated for 180 min. at 150° C. is plotted against the acetone extract. The copolymers containing above 15% of vinylidene chloride, however, are more unstable towards heat than the polyvinyl chlorides having the same acetone extract. However, like the simple polymer of vinyl chloride, they can be made sufficiently stable for practical purposes by adding a suitable stabilizer such as an organic base, a soap, a lead compound or the like.

Figure 4:
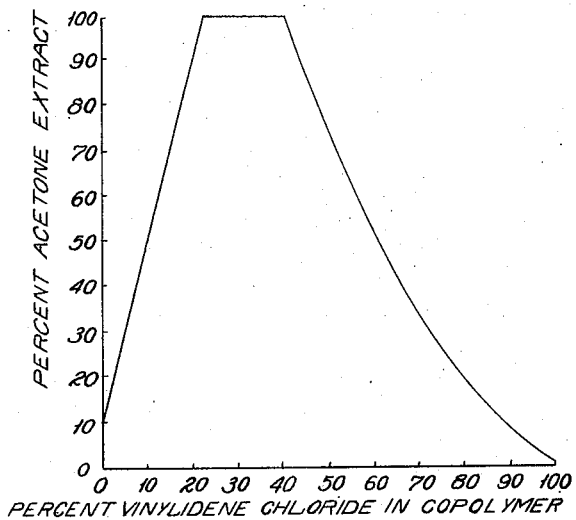
Fig. 4 represents the variation of the acetone extract with the amount of vinylidene chloride in the copolymer.

While the copolymers containing not more than about 15% of vinylidene chloride have properties which made them useful as molding plastics in a plasticized or unplasticized state, the copolymers containing greater proportions of vinylidene chloride are more valuable as paint bases. In Fig. 4 of the accompanying drawing, the acetone extract of the copolymers formed at 40° C. in 65 hours is plotted as a function of vinylidene chloride content. Though the solubility of the pure polyvinyl chloride is small and of the pure polyvinylidene chloride is even smaller, the solubility of the copolymers rapidly rises until they are completely soluble in acetone when the composition contains about 35% of the vinylidene chloride. The solubility then decreases as the proportion of vinylidene chloride increases, but the desirable properties of the copolymers disappear with the decrease in solubility.

The copolymers of this invention may be compounded in the same manner as other synthetic plastics. Thus, pigments such as clay, zinc oxide, barytes, carbon black and fillers such as talc, mica, and fibers may be included in the compositions. Stabilizers may be used if desired. The same plasticizers which can be employed with polyvinyl chloride may be incorporated in the copolymers of this invention.

Since many uses for materials having the properties herein described will be apparent to those skilled in the art, the invention is not limited to the uses described.

We claim:

1. The method which comprises polymerizing in an aqueous emulsion a mixture of vinyl chloride and vinylidene chloride in which the vinylidene chloride is present in not more than 75% by weight of the vinyl chloride.

2. The method which comprises polymerizing in an aqueous emulsion at a temperature within the range 40° C. to 50° C. inclusive a mixture of vinyl chloride and vinylidene chloride in which the vinylidene chloride is present in not more than 75% by weight of the vinyl chloride.

3. A copolymer formed by the polymerization in an aqueous emulsion of a mixture of vinyl chloride and vinylidene chloride in which the vinylidene chloride is present in not more than 75% by weight of the vinyl chloride.

4. The method which comprises polymerizing in an aqueous emulsion a mixture of vinyl chloride and vinylidene chloride in which the vinylidene chloride is present in not more than 15% by weight of the vinyl chloride.

5. The method which comprises polymerizing in an aqueous emulsion at a temperature within the range 40° C. to 50° C. inclusive a mixture of vinyl chloride and vinylidene chloride in which the vinylidene chloride is present in not more than 15% by weight of the vinyl chloride.

6. A copolymer formed by the polymerization in an aqueous emulsion of a mixture of vinyl chloride and vinylidene chloride in which the vinylidene chloride is present in not more than 15% by weight of the vinyl chloride.

7. A copolymer formed by the polymerization in an aqueous emulsion of a mixture of vinyl chloride and vinylidene chloride containing approximately 10% by weight based on the copolymer of vinylidene chloride, said copolymer being characterized by greater heat-stability than polymers of like composition prepared by homogeneous polymerization.

CLAUDE H. ALEXANDER.
HAROLD TUCKER.